US010572035B2

United States Patent
Lee

(10) Patent No.: US 10,572,035 B2
(45) Date of Patent: Feb. 25, 2020

(54) HIGH RESOLUTION AND HIGH SENSITIVITY OPTICALLY ACTIVATED CURSOR MANEUVERING DEVICE

(71) Applicant: Wen-Chieh Geoffrey Lee, Taipei (TW)

(72) Inventor: Wen-Chieh Geoffrey Lee, Taipei (TW)

( * ) Notice: Subject to any disclaimer, the term of this patent is extended or adjusted under 35 U.S.C. 154(b) by 0 days.

(21) Appl. No.: 16/119,234

(22) Filed: Aug. 31, 2018

(65) Prior Publication Data

US 2018/0373356 A1    Dec. 27, 2018

Related U.S. Application Data

(63) Continuation of application No. 15/662,596, filed on Jul. 28, 2017, now Pat. No. 10,067,577, which is a continuation of application No. 13/482,086, filed on May 29, 2012, now Pat. No. 9,720,525.

(60) Provisional application No. 61/571,514, filed on Jun. 29, 2011.

(51) Int. Cl.
*H04N 7/14* (2006.01)
*G06F 3/0354* (2013.01)
*G06F 3/042* (2006.01)
*G09G 5/00* (2006.01)

(52) U.S. Cl.
CPC .......... *G06F 3/03547* (2013.01); *G06F 3/042* (2013.01); *G09G 5/00* (2013.01)

(58) Field of Classification Search
None
See application file for complete search history.

(56) References Cited

U.S. PATENT DOCUMENTS

| | | | |
|---|---|---|---|
| 5,825,945 A | 10/1998 | Stolis et al. | |
| 6,392,632 B1 | 5/2002 | Lee | |
| 7,161,682 B2 | 1/2007 | Xie et al. | |
| 7,321,359 B2 | 1/2008 | Xie et al. | |
| 9,720,525 B2 | 8/2017 | Lee | |
| 2004/0016811 A1* | 1/2004 | Fernandez | G06K 7/10881 235/462.01 |
| 2007/0063981 A1 | 3/2007 | Galyean, III et al. | |
| 2007/0152977 A1 | 7/2007 | Ng et al. | |

(Continued)

OTHER PUBLICATIONS

Photonics Rules of Thumb, Optics, Electro-Optics, Fiber Optics, and Lasers, by John Lester Miller & Ed Friedman, McGraw-Hill Copyright 1996, ISBN 0-07-044329-7, pp. 297-298 and 306-307.

(Continued)

*Primary Examiner* — Carl Adams
(74) *Attorney, Agent, or Firm* — Saile Ackerman LLC; Stephen B. Ackerman

(57) ABSTRACT

A device for analyzing the surface structure of an object, the device comprising a touchable Lambertian light diffusing surface that covers a cavity containing a light source and an image sensor. The image detector senses the contact of the outer Lambertian surface of the device by a contacting object, for example a finger-tip, by means of light from the light source reflecting back to the image detector. At the same time, ambient light from objects external to the device is diffusely scattered by the Lambertian surface as it enters the cavity and does not affect the ability of the image detector to clearly determine the surface structure of the contacting object. Thus, for example, the surface contours of a fingerprint may be determined with a high signal-to-noise ratio.

7 Claims, 5 Drawing Sheets

(56) References Cited

U.S. PATENT DOCUMENTS

2009/0315989 A1\* 12/2009 Adelson .............. A61B 5/1172
 348/135
2011/0096394 A1 4/2011 Liu et al.

OTHER PUBLICATIONS

Optics, Fourth Edition, International Edition, by Eugene Hecht, Adelphi University, Copyright 2002, Pearson Education Inc., Chapter 4, 10 pgs.
"Capacitive Proximity Sensing Using the FDC1004," by David Wang, Texas Instruments, Application Report SNOA928—Mar. 2015, 9 pgs.
"Determining Shape and Reflectance of Lambertian, Specular, and Hybrid Surfaces using Extended Sources," by Shree K. Nayar et al., International Workshop on Industrial Applications of Machine Intelligene and Vision (MIV-89), Tokyo, Apr. 10-12, 1989, pp. 169-175.
Labshpere, A HALMA Company, Technical Guide, Reflectance Materials and Coatings, North Sutton, NH 03260 USA, Jan. 1, 1991, 25 pgs.
European Search Report, Application Number: 12368015.9-1959 / 2549364, Applicant: Wen-Chieh, Geoffrey Lee, dated Oct. 1, 2015, 8 pgs.

"Review of CMOS image sensor," by M. Bigas, et al., Microelectronics Journal 37, Sep. 6, 2005, pp. 433-451, www.elsevier.com/locate/mejo.
"Samsung Launches 'Optical Joystick' Phone," by Allen Tsai, Jul. 2, 2008, found: http://www.mobiledia.com/news/54829.html, pp. 1-4.
"CMOS Image Sensor for High Speed Applications," by Munir El-Desouki, et al., Sensors, Jan. 13, 2009, pp. 430-444, doi: 10.3390/s90100430, www.mdpi.com/journal/sensors, ISSN 1424-8220.
"TwistMouse for Simultaneous Translation and Rotation," by Jacqui Hannagan, A dissertation submitted for the partial fulfilment of the requirements for the degree of Bachelor of Commerce (Honours), at the University of Otago, Dunedin, New Zealand, Nov. 14, 2007, pp. 1-117.
"Inside the Trackpad: a BlackBerry Science Lesson," Inside BlackBerry, The Official BlackBerry Blog, found: BlackBerryBlog #Five TipFriday: #BlackBerry social, Dec. 18, 2009, 2 pgs.
HTC Touch Diamond vs. Samsung i900 Omnia: Head-to-Head,: C Status, found: http://www.gsmarena.com/htc_touch_diamond_vs_samsung_i900_om ... Dec. 20, 2006, 2 pgs.
"Brace yourself for the era of the 'fingermouse'," by Stephen Shankland, Deep Tech—CNET News, pp. 1-4, Mar. 25, 2010, found: http://news.cnet.com/8301-30685_3-20001191-264.html.

\* cited by examiner

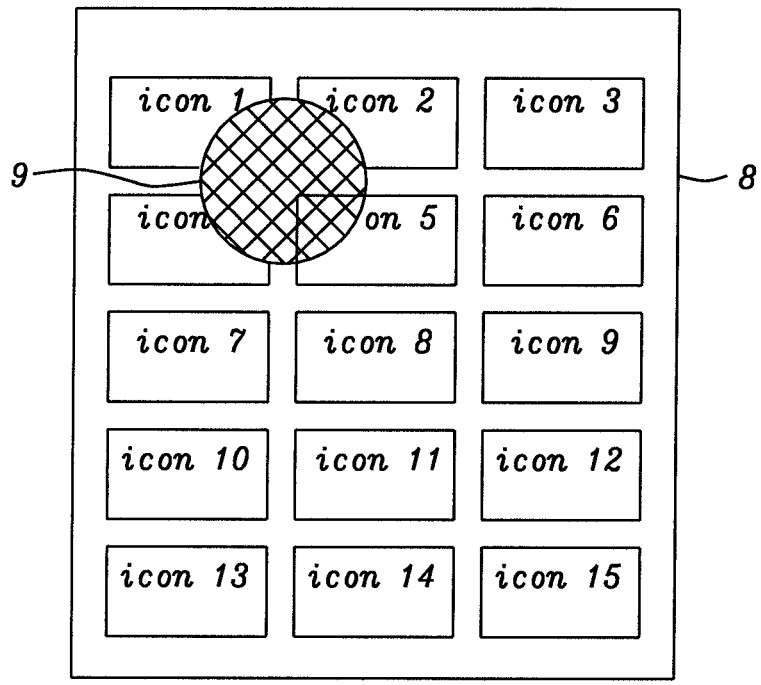
FIG. 1 - Prior Art
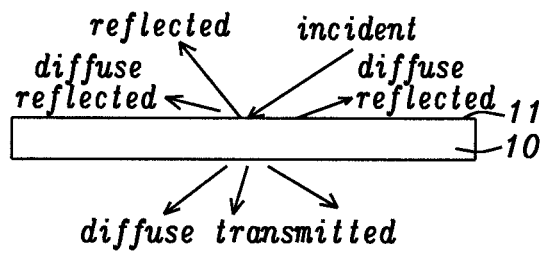
FIG. 2A
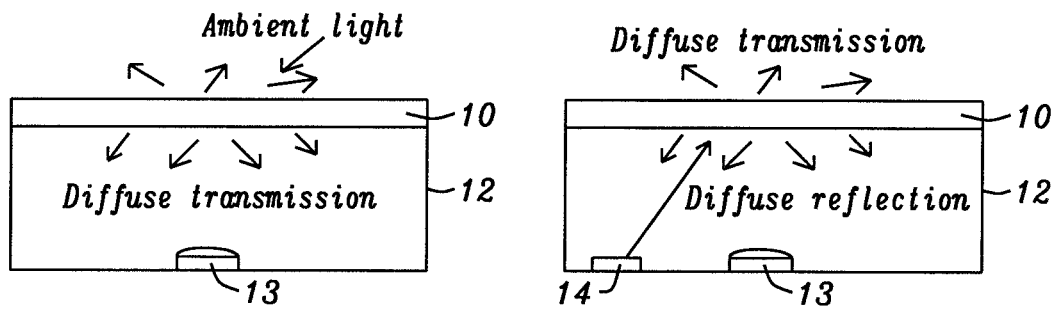
FIG. 2B   FIG. 2C

Combined image seen by the image sensor

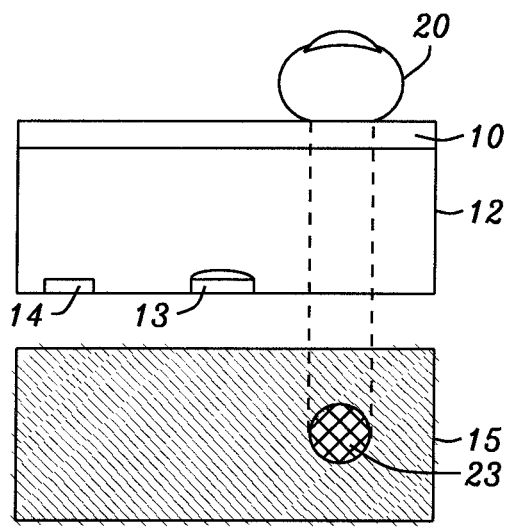
FIG. 4A
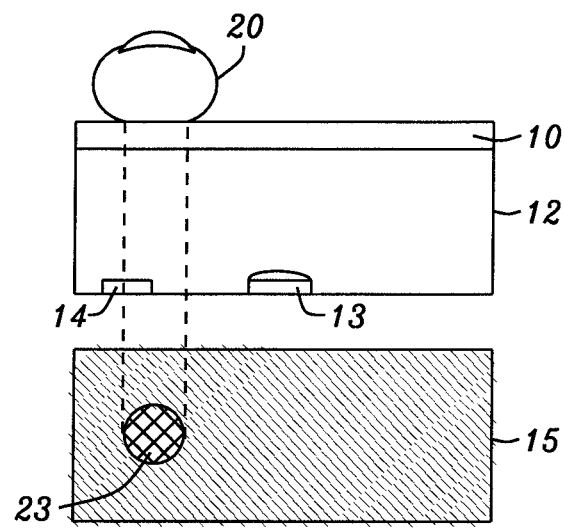
FIG. 4B
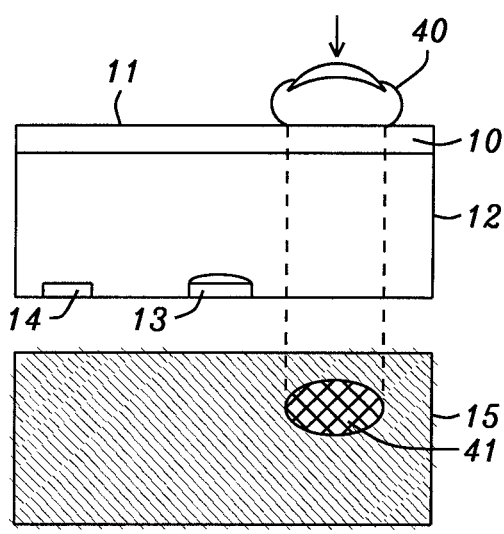
FIG. 5A
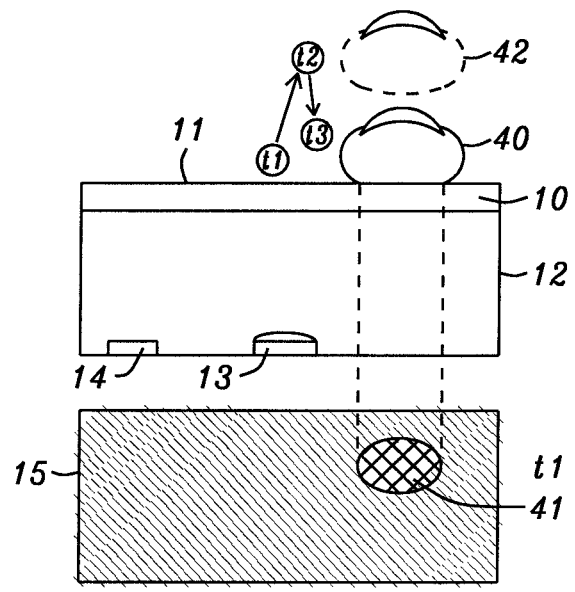
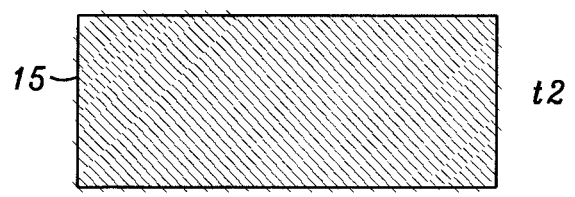
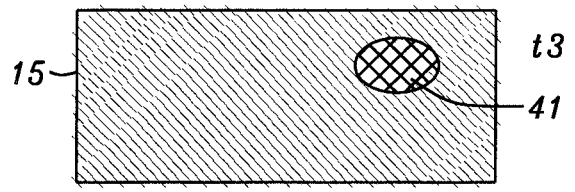
FIG. 5B

HIGH RESOLUTION AND HIGH SENSITIVITY OPTICALLY ACTIVATED CURSOR MANEUVERING DEVICE This application is a Continuation application of U.S. application Ser. No. 15/662,596, filed on Jul. 28, 2017, which is a Continuation application of U.S. application Ser. No. 13/482,086, filed on May 29, 2012, now issued as U.S. Pat. No. 9,720,525, which claimed benefit of U.S. Provisional application No. 61/571,514, filed on Jun. 29, 2011, now abandoned, each of which is owned by a common owner and is herein incorporated by reference in its entirety.

1. TECHNICAL FIELD

The present invention relates generally to portable electronic products and more particularly to a cursor-maneuvering device.

2. BACKGROUND

Various kinds of electronic devices, e.g. notebook personal computers, cell phones, global positioning devices, as well as electronic gaming devices, rely on the touching of a flat panel, which may be a touch pad or a display screen of the electronic device. Two of the most popular sensing technologies used are resistive and capacitive sensing technologies, which provide users a convenient way to control the electronic devices as opposed to a mouse connected by a USB cable to the portable electronic device. However, the lack of positioning accuracy by a pointing device, e.g. a finger or a pointing stylus, tends to limit the use in an office environment.

Although, these electronic devices provide an advantage by being portable, it is difficult for them to be used in an office environment where the lack of positioning accuracy limits their use for data entry such as a word processor document or a spreadsheet where positioning accuracy is important. FIG. 1 of prior art shows a flat panel touch screen of a cellular phone commonly know as a smart phone 8, whereupon there are a number of relatively large icons, which are displayed simultaneously, that represent programs that can be activated when selected. The number of icons is a compromise between allowing a large number of them to be displayed at once and a size of each icon necessary to allow the user to be able to select them with the individual's finger. FIG. 1 shows an approximate size of a fingertip 9, which when misplaced can attempt to select up to four programs simultaneously.

The smart phone 8 shown in FIG. 1 uses a capacitor that lies behind the touch screen of the smart phone. When the surface of the smart phone screen is touched the capacitance of the capacitor is disturbed causing charge on the capacitor to change and current to flow into sensors usually positioned at each of the four corners of the smart phone. The change in current flow into these four sensors is then analyzed to determine the approximate location of the touch point of the user's finger. The resulting analysis only needs to be accurate enough to define an icon location, which can be seen from FIG. 1 has a fairly broad dimensional location; and therefore allows a fairly broad inaccuracy in the calculated prediction of the location of the user's finger touch. Further, this inaccuracy in the prediction of the location of the finger touch is a main reason why small electronic devices like the smart phone have extreme difficulty in data entry into the text of a word processor or a spreadsheet, and makes the smart phone nearly useless for this purpose. Thus use in a business environment is relegated to display operations of the programs represented by the various icons.

With respect to a notebook PC the cursor moving device is a touch pad that many users abandon for a PC mouse attached by an USB cable to the notebook PC. Ease of use and positional accuracy of the cursor pointer are two of the reasons for the abandonment of the touch pad; although, there are users who have become adept at using the touch pad for the convenience of not having to lug a computer mouse and the USB cable appendage in the mobile society for which the notebook PC was designed. Part of the problem is that the notebook PC touch pad has not kept up with the resolution and speed of the display for the notebook PC requiring the user to invoke several strokes on the touch pad to move the cursor from one location on the display screen to another.

U.S. Pat. No. 6,392,632 (Lee) is directed toward an optical cursor control device comprising an integrated camera, wherein captured images by an imaging device detects motion of the cursor control device. U.S. Patent Application No. 2005/0024336 (Xie et al.) is directed to the use of a Lambertian surface in a computer mouse to form a specular reflection, which provides an enhanced contrast to the image for purposes of navigation. U.S. Patent Application No. 2005/0024623 (Xie et al.) is directed to the use of a Lambertian surface and a narrow bandwidth of light in a computer mouse to form a narrow bandwidth specular reflection. U.S. Pat. No. 5,825,945 (Stolis et al.) is directed to an check imaging device using a Lambertian surface to project a highly uniform and diffused beam to an imaging site.

Whether it is the touch pad of a notebook PC or the pointing inaccuracy involved with a touch screen of a portable device, there is a need for a fast and accurate pointing control device for use with portable electronic units. The pointing control device must be integral to the portable electronic unit and have the speed and accuracy to facilitate the use of the portable electronic unit, such as the notebook PC, in the business environment, where word processor documents and spreadsheets can be easily created with accurate and easy data and word entry.

SUMMARY

It is an objective of the present invention to provide a sensitive and high resolution cursor maneuvering device for portable electronic equipment such as notebook computers.

It is further an objective of the present invention to form the cursor maneuvering device using a light source, a photo imaging device and a semi-transparent plate comprising a light diffusing surface such as a Lambertian surface.

It is still further an objective of the present invention to provide the capability to use multiple fingers contacting the light diffusing surface, or Lambertian surface, to maneuver multiple objects or to initiate operations in addition to the maneuvering of the cursor.

The present disclosure provides a cursor-maneuvering device formed by a cavity covered by a semi-transparent plate containing a light diffusing surface, wherein the cavity contains at least one light source and at least one image sensor. The light diffusing surface, in particular a Lambertian surface, can be a near perfect diffusing surface, where the intensity of the light emanating in a given direction from any small surface component is proportional to the cosine of the angle of the normal to the surface. The brightness (luminance, radiance) of a Lambertian surface is constant regardless of the angle from which it is viewed. The plate is semi-transparent to the degree that light from either side of the plate can be observed in a highly diffused state that does not allow one to discern a shape of an object at a distance from the opposite side of the plate as a result of the Lambertian surface. The semi-transparent plate that covers the cavity disperses ambient light falling on the Lambertian surface from the environment external to the cursor maneuvering device as well as the light from the light source within the cavity and provides a diffused homogeneous appearance of the outer side and the underside of the plate. Images of distant objects from the plate are diffused by the Lambertian surface to the degree that they are not distinguishable by the image sensor.

It should be noted: 1) The light source within the cavity is preferably an LED device; however, other light sources can be used. 2) The image sensor is preferably a CMOS imaging device capable of viewing the entire inside surface of the semi-transparent plate covering the cavity; however, other imaging devices capable of viewing the entire surface of the transparent plate to determine the location of the reflectance of a pointing device can be used. 3) The surface of the semi-transparent plate is preferably a Lambertian surface formed with a fine grain surface; however, other surfaces may be able replace the Lambertian surface at a reduced performance, such as a course grain (rough) Lambertian surface, an etched surface or a frosted surface. It should also be noted that although the aforementioned three preferred elements of the present disclosure may have alternatives, the use of these alternatives fall within the scope of the present disclosure.

When a pointing device, e.g. a finger, stylus or similar device, contacts the Lambertian surface of the semi-transparent plate, a reflection of light from the light source within the cursor-maneuvering device produces an brightened image of the of the pointing device. The image sensor then detects this brightened image and follows the brightened image as it is moved over the Lambertian surface from which electronics associated with the image detector provides control to a cursor on the screen of an portable electronic device, e.g. notebook PC, cellular phone, global positioning system, gaming device, etc. Further, the pointing device can be lifted and reapplied to the Lambertian surface to indicate selection of an element on the display of the electronic device. Still further and especially in the case of the notebook PC, multiple fingers can be uses in various predetermined locations on the Lambertian surface to perform functions in addition to cursor movement, e.g. scrolling, rotating an image, zooming in on the display screen to provide high resolution and sensitivity for accurate positioning of the cursor.

The image sensor is controlled to capture a plurality of images of the pointing device, preferably a finger. Within the plurality of images, a first and a second image are segmented to extract motion vectors to control the movement of a cursor on a display screen. In the case of the use of a finger as a pointing device, the ridges, groves, curls and intersections of the fingerprint provide the definition that is tracked between the first and second image. The electronics coupled to the image sensor segments the images and compares position changes that translate into the motion vectors used to control the cursor on a display screen.

BRIEF DESCRIPTION OF THE DRAWINGS

This invention will be described with reference to the accompanying drawings, wherein:

FIG. 1 is a diagram of prior art of a touch panel of a modern cellular phone;

FIGS. 4A and 4B are diagrams of the location of the brighten image of the pointing device of the present invention;

FIG. 5A is a diagram of the shape of the brightened image of a finger that is pressed onto the surface of the cursor-maneuvering device of the present invention;

FIG. 5B is a diagram demonstrating the touching of surface of the cursor-maneuvering device of the present invention;

DETAILED DESCRIPTION

Figure 2D:
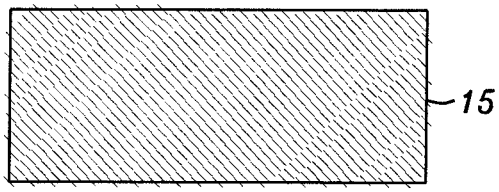
FIG. 2 A-2F are diagrams of the cursor-maneuvering device of the present invention.

In FIG. 2A is shown a semi-transparent plate 10 of the present invention that has a Lambertian surface 11. An incident light impinging upon the Lambertian surface results in reflected light, diffused reflected light and diffused transmitted light. When light falls on a Lambertian surface, the light is scattered such that the apparent brightness of the surface to an observer is the same no matter the observers viewing angle, and the surface is isotropic, or uniform in all directions. The same is true with respect to the transmitted diffused light. In other words an observer underneath or at the bottom of the semi-transparent plate will also see a uniform appearance in all directions. It should be noted that the term "semi-transparent" means that although light can get through, the light is diffused to a degree that distant objects cannot be interpreted or seen.

FIG. 2B shows a cavity 12 of the cursor-manipulating device of the present invention that is covered by the semi-transparent plate 10, which contains a Lambertian surface. The image sensor 13 views through a lens a diffused light that is uniform in all directions resulting from the ambient light that is impinging on the outer Lambertian surface of the semi-transparent plate 10. There is no definition of any object that is remote from the Lambertian surface.

In FIG. 2C a light source 14 in the cavity 12, preferably an LED, directs light to the semi-transparent plate. Again the Lambertian surface scatters the light from the light source such that the portion that is reflected is diffused and will have a uniform appearance to the image sensor 13 in all directions. Further any light from the LED that is transmitted by the semi-transparent plate will be a diffused transmission in which an observer beyond the surface of the semi-transparent plate will not be able to discern the light source other than perhaps the brightness of the top surface of the semi-transparent plate is slightly brighter.

Figure 2E:
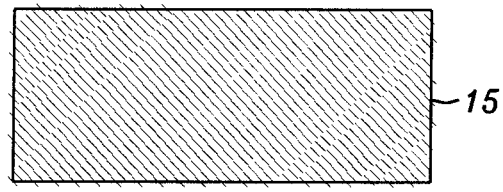
Figure 2F:
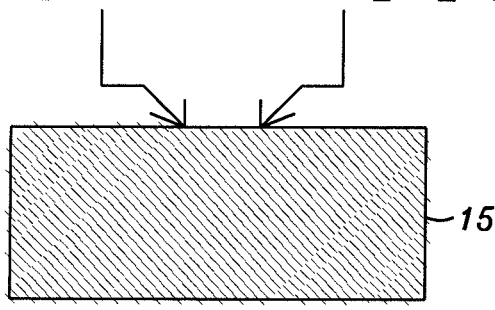

FIG. 2D and FIG. 2E demonstrate the appearance of the underneath side 15 of the semi-transparent plate 10 as seen by the image sensor 13, a uniform appearance that has some light intensity. FIG. 2F is the view of the image sensor 13 where the addition of the effects of the impinging ambient light and that of the light source has a diffused appearance on the underneath surface 15 of the semi-transparent plate in which the diffused light is uniform in all direction with no discernable features.

Figure 3:
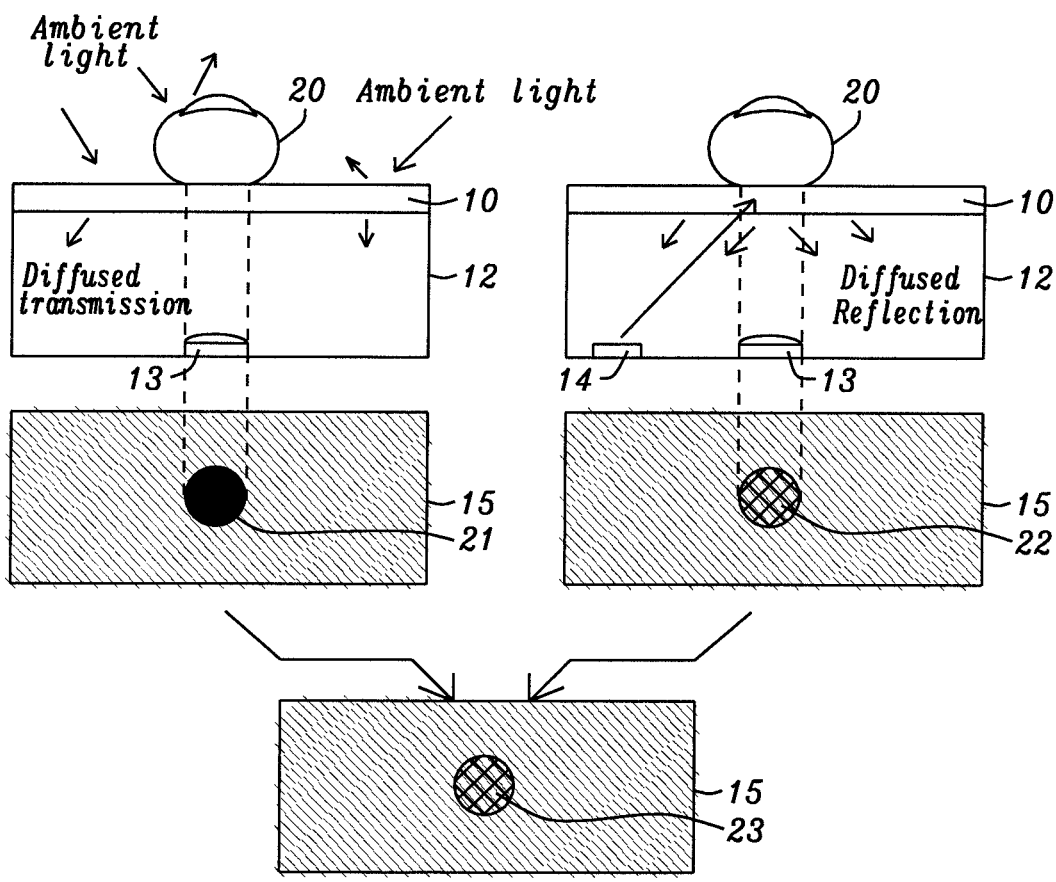
FIG. 3 is a diagram of the effect of a pointing device contacting the surface of the cursor-maneuvering device of the present invention.

In FIG. 3 is shown the effects of touching the Lambertian surface of the semi-transparent plate with a pointing device, where the pointing device can be any number of items such as a stylus, rubber eraser on a pencil and a finger 20 as a pointing device. When a pointing device, such as a finger 20, touches the surface of the semi-transparent plate, the ambient light is blocked from impinging upon the surface of the semi-transparent plate directly under the pointing device, and when the light source 14 is not on or does not exist, the image sensor will see a shadow 21. When the light source 14 is added to the cavity 12, a brightened surface of the pointing device contacting the Lambertian surface, hereafter designated the brightened pointer surface, will be discernable by the image sensor 13. The addition of the effects of the ambient light alone and the light source 14 within the cavity produces a brightened pointer surface 23 of the pointing device in contact with the Lambertian surface that can be readily detected by the image sensor and analyzed with respect to movement and location by the electronic circuits associated with the image detector.

It should be noted that the detailed characteristics of the pointer surface of the pointing device contacting the Lambertian surface, brightened by the light source 14, are visible to the image sensor 13. For instance, if the pointing device is a finger, the details of the fingerprint, e.g. the ridges, groves, curls and intersections, are clearly detectable by the image sensor within the brightened pointer surface in contact with the semi-transparent plate. It is the details of the fingerprint within the brightened pointer surface 22 that the image sensor 13 monitors to determine movement that is translated into a cursor position on a display screen of an electronic device.

FIG. 4A demonstrates what the image sensor 13 of the cursor-maneuvering device sees when a pointing device, in this case a finger 20, touches the right side of the Lambertian surface of the semi-transparent plate 10 when the light source 14 is illuminated. The surface of the semi-transparent plate 15 facing the image sensor displays a brightened surface of the fingerprint 23 in contact with the semi-transparent plate. The brightened surface 23 is a result of light from light source 14 being reflected back into the cavity from the finger 20 that is pressing the Lambertian outer surface of the semi-transparent plate 10. The remainder of the surface of the underside 15 of the semi-transparent plate surrounding brightened pointer surface 23 has a diffused appearance resulting from the diffusion of both the ambient light and the light source by the Lambertian surface.

If the finger 20 is moved to the left side of the Lambertian surface on top of the semi-transparent plate 10, the brighten pointer surface 23 will appear to the image sensor 13 to now be on the left side of the semi-transparent plate as shown in FIG. 4B. If the finger 20 is kept in contact with the Lambertian surface as the finger is moved to the left side, the image sensor will track the details of the finger touching the surface of the semi-transparent plate 10 that form the brightened pointer surface 23 as the finger 20 is moved from right to left. The electronics associated with the image sensor 13 will convert the track of the details of the finger within brightened pointer surface 23 into cursor movement coordinates on the display screen of the electronic device to which the cursor-maneuvering device is connected.

If the finger 20 is first lifted from the Lambertian surface of the semi-transparent plate, the image sensor will not detect anything until the finger is place down onto the Lambertian surface on the left side of the semi-transparent plate, where the brightened pointer surface 23 will appear under the finger on the left side.

FIG. 5A shows how the image detected by the image sensor 13 changes the shape of the brightened pointer surface 41 when the finger 40 is pressed relatively hard onto the Lambertian surface 11 of the semi-transparent plate 10. Although the brightened pointer surface 41 is more elliptical in shape, the electronics associated with the image sensor 13 is able to determine the location of the pressed finger and translate that position into a location on the screen of the electronic device such as a notebook PC. It should be noted that the image sensor senses the remaining area of the underside 15 of the semi-transparent plate 10 as an area of highly diffused light that contains no recognizable elements or features.

In FIG. 5B a finger pointer 40 is located by the brightened pointer surface 41 at time t1, which is translated into a cursor location on the display screen of the electronic device, e.g. a notebook PC. At time t2 the finger 40 is lifted to position 42 and the brightened pointer surface 41 is blurred beyond recognition and no longer seen by the image sensor 13. The entire surface of the underside of the semi-transparent plate exhibits a uniform diffused light over the entire surface of the underside of the semi-transparent plate with no distinguishable features. At time t3 the finger 40 is brought back into contact with the Lambertian surface 11 of the semi-transparent plate 10 and the brightened pointer surface reappears, which can be seen by the image sensor 13. In the mean time the cursor on the display screen of the notebook PC remains stationary. When the finger 40 is reapplied to the Lambertian surface, the act of removing the finger and reapplying the finger is a tapping action on the semi-transparent plate and can be used to signify the selection of the item under the cursor on the display screen, or if the finger immediately moves upon re-contact at time t3, the immediate movement can imply to the electronics couple to the image sensor that the cursor is to be moved in the direction of the movement of the finger.

Figure 6:
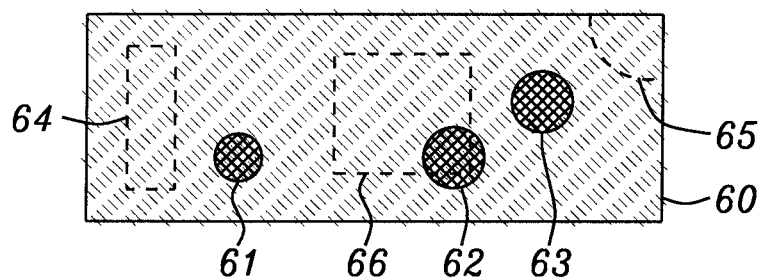
FIG. 6 is a diagram of multiple touch point functions of the cursor-maneuvering device of the present invention.

In FIG. 6 is shown the underside surface 60 of the semi-transparent plate 10 that is viewed by the image sensor 13. There are several brightened pointer surfaces that demonstrate that a first finger (or pointing device) 61, a second finger 62 and a third finger 63 are simultaneously in contact with the Lambertian surface 11 of the transparent plate 10. Although, only three finger contacts (pointing devices) are shown, the number can be greater or less than the three that are shown. The multiple fingers, or pointing devices, can be used to control multiple events on the display screen of the electronic device, e.g. notebook PC, including multiple cursors. Or the multiple fingers could be used to control other functions of the electronic device.

There are several special areas designated on the underside surface 60 of the semi-transparent plate that are recognizable by the coordinate electronics couple to the image sensor. The first is an area 64 allocated to scrolling the image on the display screen of the electronic device to which the cursor-maneuvering device of the present invention is coupled. This scrolling area when entered by one of the fingers (pointing device) 61, 62, 63 allows the finger in the scrolling area 64 to scroll through pages displayed on the notebook PC screen, similar to the scrolling wheel on a computer mouse. The second area 65 is an area that is used to rotate the image displayed on the screen of the electronic device and the third area 66 shown is an area that provides a high resolution and sensitivity that is used, for instance, to position the cursor on the screen of the notebook PC onto a small area like a spread sheet cell, or a particular letter or word in a sentence of a word processor document. Other special areas that might be assigned to the functions are equivalent to the standard right and left mouse buttons and/or some of the functions found on a computer keyboard.

Figure 7:
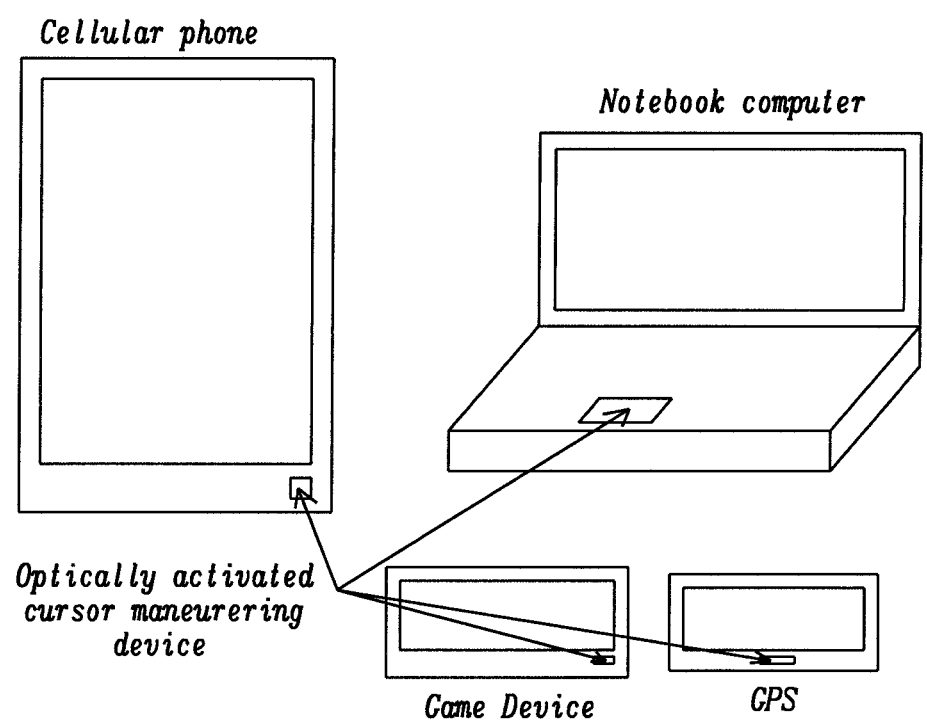
FIG. 7 is a diagram of potential use of the cursor-maneuvering device of the present invention.

FIG. 7 shows some of the electronic devices in which the cursor manipulating device of the present invention can be applied. These electronic devices include but not limited to a notebook PC (laptop PC), a cellular phone similar to those that have a full display screen on which multiple icons can be displayed, a hand held game device that is popular with young people and adults, and a GPS unit. It should be noted that the area allocated to the optically activated cursor maneuvering device of the present invention is considerably smaller for the cellular phone, game device and the GPS unit than the area allocated to the optically activated cursor maneuvering device (mouse pad) of the notebook computer. This is necessary so as to not require these handheld devices, cellular phone, game device and GPS unit, to become substantially larger; however, it is within the scope of this invention that a larger sized optically activated cursor maneuvering device can be located on the backside of the handheld electronic devices.

Further, the minimum area of semi-transparent plate comprising a Lambertian surface of this invention can be at least as small as an area described by a circle having a diameter of approximately one half centimeter. This is smaller than the size of most fingers that would be used on the handheld devices. There would not be any ambient light impinging on the surface of the Lambertian surface of the semi-transparent plate when covered by a finger, and the light source within the cavity is the source of light to brighten the pointer surface, a finger. The features of the fingerprint, e.g. the ridges, groves, curls and intersections, are monitored by the image sensor to detect finger movement over the small semi-transparent plate area and thereby directing the cursor of the handheld devices. The shape of the small semi-transparent plate containing a Lambertian surface need not be circular, and can be rectangular, square or any other shape necessary to satisfy the design of the handheld device.

Still further, the small optically activated cursor maneuvering device described herein for handheld electronic devices can also be used on a notebook PC, an electronic note pad, electronic tablet, tablet computer, e-book reader, electronic media player, or similar devices. It is conceivable that the optically activated cursor maneuvering device described herein could replace the computer mouse for desktop computers, eliminating the need for a computer mouse by substituting the cursor maneuvering device of the present invention for the computer mouse or integrating the cursor maneuvering device with a keyboard or a display screen of the desktop computer.

When a light beam impinges on a surface, a portion of the light will be reflected, and the rest will be absorbed or transmitted. When the surface is very smooth, the process of reflecting light is often referred as specular reflection. When said surface is rough in comparison to the wavelength of light, the resultant behavior is called diffuse reflection. Both of these are extreme conditions, the reflecting behavior of most materials that are encountered in the practical world are somewhere between the two extreme conditions.

A Lambertian surface has a unique property, which is known as the cosine emission law or Lambert's cosine law, wherein when a perfect Lambertian surface is viewed from any angle, it has the same radiance. This means that to an image sensor the object and background scene have the same apparent brightness (or luminance). Most materials perform specular reflecting and diffuse reflecting simultaneously. The present invention uses both characteristics for different occasions, such as finger touching and non-touching.

Figure 8:
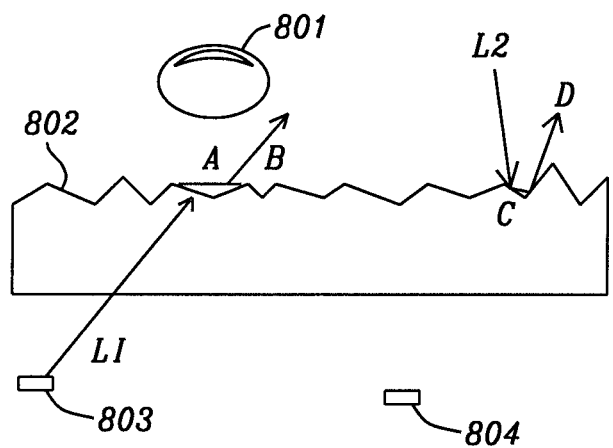
FIG. 8 is a diagram of the optical effects of a rough diffusion surface when a pointing device is not in contact with the surface.

In the present disclosure, Lambertian diffusion is a term associated with the bulk phenomenon of a material which blurs the contour of an object by a diffused refection effect. Other optical effects such as transmission, absorption, scintillation, may accompany the diffuse reflection effect. These effects may not be explicitly shown herein, but the effects exist. FIG. 8 demonstrates an exemplary case of such an effect. When a surface 802 is quite rough, the portion of light that can be used for forming the clear images per the specular reflection effect is decreased. The diffuse reflection effect, on the other hand, is manifested. This can be denoted by the multiple segments of light paths, i.e. paths A, B and C, D, respectively. Note that A and B are generated by a light source 803 that directs a light L1 at the surface 802. Light path C and D are generated by ambient light L2. Despite L1 and L2 come from the opposite directions, they have similar diffuse reflection effect due to the Lambertian surface 802 being an isotropic- and reflects light to all angles evenly. The finger 801, which is above but not touching the Lambertian surface 802, is not seen by the image detector 804 because a portion of the light from the light source 803 that reaches the finger is reflected back similarly to the paths C and D of external light L2 and as a consequence is highly diffused.

Figure 9:
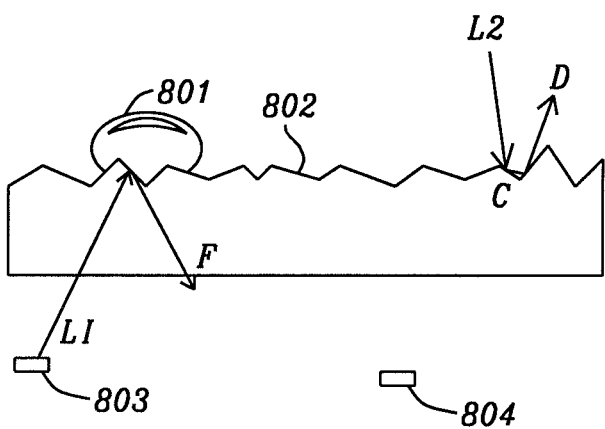
FIG. 9 is a diagram of the optical effects of a rough diffusion surface when the pointing device is in contact with the surface.

The situation shown in FIG. 8 will be changed when paths A and B are blocked. As FIG. 9 shows, paths A and B now are blocked by the finger 801 which touches the Lambertian surface 802. It should be noted that in the practical case, this Lambertian surface 802 can be made of the materials that bear the property between the two extremes of specular reflection and diffuse reflection. So what is really blocked is the diffuse reflection, the specular reflection part can be preserved or even enhanced. As FIG. 9 shows, being perturbed by the touching of the Lambertian surface 802 with the finger 801, segments A and B no longer exist; the remaining reflecting path is F, which subsequently causes the intensity of the image (finger) generated by light source 803 and detected by the image sensor 804 to be enhanced. As FIG. 9 also shows, the blurred image of the background which comes from the ambient light L2 stays intact since the diffusion paths C and D stay intact. According to the fundamental material science, the performance of the Lambertian surface being used by the present disclosure is readily affected by surface morphology (roughness, etc.), refractive index of the Lambertian plate and that of the medium touching said Lambertian surface. Other factors that deal with the transmission property of the media, reflection, and absorption, etc. may also affect the intensity of the image seen by the image sensor 804.

With the aforementioned physical principles illustrated, the present invention is able to adopt the many ways to fabricate a non-perfect Lambertian surface and still reach its ultimate goal of motion detection. The rule of thumb is the same. By optimizing the surface morphology, refractive index, reflectivity, etc. of the Lambertian plate, the diffusion and reflection effect of the light diffusing plate (namely the Lambertian plate in the present disclosure) is controlled in such a way that the intensity of the image of the object that is not engaged in touching the diffusion plate, such as a non-perfect Lambertian plate, is blurred as viewed through the plate, and vice versa (not blurred) for that of the object being engaged in touching the diffusion plate. Typical methods comprise harnessing the surface roughness of the Lambertian plate, depositing an over-coating layer with higher refractive index onto the light diffusing plate, or even paving another highly reflective layer over the Lambertian plate, etc. These means all fall into the essential spirit of the present invention.

It should be noted that any motion detection of a pointing device through a transparent, or semi-transparent, plate containing a surface that diffuses light in such a way that a distant non-touching pointing device is blurred and difficult to detect, or non-detectable, while a pointing device that touches the surface of the semi-transparent plate is non-blurred, or visible, and is detectable as viewed through the plate, and is within the scope of this disclosure.

While the disclosure has been particularly shown and described with reference to preferred embodiments thereof, it will be understood by those skilled in the art that various changes in form and details may be made without departing from the spirit and scope of the disclosure.

What is claimed is:

1. A surface-contact device for analyzing surface features of a fingertip for biometric identification purposes comprising:
    a cavity within which is located a light source and an image sensor sensitive to said light source; wherein
    said cavity is covered by a hard, non-deformable semi-transparent plate having an outer surface and an inner surface; and wherein
    said outer surface is a Lambertian surface; and wherein
    said inner surface is configured for being illuminated from within by said light source and, when said illumination occurs, said illumination also strikes said Lambertian surface and a bright reflection is radiated from surface features of an object contacting said outer Lambertian surface; wherein
    a finger tip is placed against said outer surface in a predetermined position, whereby
    said bright reflection creates a well defined image of said surface features in said predetermined position that is detectable by said image sensor; and wherein
    said well defined image of said surface features is distinguishable from images formed by ambient illumination of arbitrary intensity and frequency emanating from background objects external to said device and not in contact with said Lambertian surface and wherein said ambient illumination, therefore, is diffusely scattered from said Lambertian surface; whereby,
    said well defined prepositioned image is configured for analysis to determine surface features; then
    recalling from an associated memory cache a set of stored images of prepositioned finger tips created by the method described above and comparing them individually to said surface features of said well defined prepositioned image above.

2. The device of claim 1, wherein said Lambertian outer surface blurs images of all objects not in contact with said Lambertian outer surface so that no such image is detectable by said image sensor as having a discernable pattern and wherein internal illumination striking said Lambertian surface sharpens the image of an object having a patterned surface when said object is contacting said Lambertian outer surface thereby allowing a detection of its pattern by the image sensor, whereby background images are eliminated and said pattern of said object in contact with said Lambertian surface is configured for identification by comparison with each of said stored images.

3. A surface-contact method of feature analysis of an object having surface features and of comparison with similar objects, comprising:
    providing a surface contact device, wherein said device comprises a cavity within which is a light source and an image sensor sensitive to said light source and wherein said cavity is covered by a hard and non-deformable semi-transparent plate having a contactable Lambertian outer surface, wherein said semi-transparent plate is configured for being illuminated from within by said light source;
    contacting said Lambertian outer surface of said hard and non-deformable semi-transparent plate with an object having a surface feature to be analyzed, wherein said object is aligned against said surface in a particular position, whereby said surface feature contacts said Lambertian outer surface; then
    illuminating said surface feature from within said cavity using said light source, whereupon said surface feature becomes visible to said image sensor as a bright reflection; while
    contours of images formed by ambient illumination of arbitrary intensity and frequency from background objects external to said device and not in contact with said Lambertian surface are diffusely scattered by said Lambertian outer surface and, thereby, said image sensor detects no fixed patterns from said external objects and;
    capturing images of said surface features while said object is in contact with said Lambertian surface for current or future analysis; then
    recalling from an associated memory cache a set of stored images of prepositioned similar objects created by the method described above and comparing them individually to said surface features of said prepositioned images of similar objects above.

4. An image processing device, comprising:
    a) a cavity covered by a hard and non-deformable semi-transparent plate having a Lambertian outer surface and a transparent inner surface;
    b) a source of illumination within said cavity wherein said illumination is directed at said transparent inner surface;
    c) ambient illumination directed at said Lambertian outer surface from objects external to said device;
    d) an image sensor within said cavity, said image sensor being sensitive to said illumination from both said source of illumination within said cavity and said ambient illumination from objects external to said cavity
    e) a memory cache for storing images created using said image processing device;
    f) a method for comparing images and determining differences between them;
    whereby
    when an object contacts said Lambertian surface said image sensor is presented with two forms of illumination, illumination from said external objects which is diffusely scattered from said Lambertian surface and reaches said image sensor in a non-identifiable form and illumination from said source of illumination within said cavity that is reflected back at said sensor from said object contacting said Lambertian surface from below, which is bright and less scattered illumination and reaches said image sensor in an identifiable form; whereby said reflected image is highly resolved and clearly identifiable by said image sensor and said ambient illumination does not adversely affect identifiability of said object and enables the creation of comparable images.

5. The device of claim 4, wherein said contacting object is a finger, and wherein said pattern comprises features of a fingerprint of said finger, and wherein said fingerprint is configured for comparison with stored images of fingerprints to produce an identification thereof.

6. The device of claim 5 wherein said contacting object has a pressure-deformable surface pattern and wherein said hard and non-deformable Lambertian surface provides a consistent effect on said pattern that is not a function of a pressure reaction of the Lambertian surface.

7. The device of claim 6 wherein said fingerprint is an object having a pressure-deformable surface pattern and wherein an image of said fingerprint is captured faithfully.

* * * * *